United States Patent
Huang et al.

(10) Patent No.: US 8,473,765 B2
(45) Date of Patent: Jun. 25, 2013

(54) METHOD AND SYSTEM FOR ADJUSTING CPU FREQUENCY

(75) Inventors: Li-Hong Huang, Shenzhen (CN); Shu-Fu Huang, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 204 days.

(21) Appl. No.: 13/077,407

(22) Filed: Mar. 31, 2011

(65) Prior Publication Data

US 2012/0060022 A1 Mar. 8, 2012

(30) Foreign Application Priority Data

Sep. 8, 2010 (CN) .......................... 2010 1 0275756

(51) Int. Cl.
*G06F 1/00* (2006.01)
*G06F 15/177* (2006.01)
(52) U.S. Cl.
USPC .............................................. 713/322; 713/2
(58) Field of Classification Search
USPC ....................................................... 713/300
See application file for complete search history.

(56) References Cited

U.S. PATENT DOCUMENTS

| | | | |
|---|---|---|---|
| 6,574,739 B1 * | 6/2003 | Kung et al. | 713/322 |
| 6,721,894 B2 * | 4/2004 | Maher et al. | 713/323 |
| 2004/0059956 A1 * | 3/2004 | Chakravarthy et al. | 713/600 |
| 2010/0191936 A1 * | 7/2010 | Khatri et al. | 712/42 |

* cited by examiner

*Primary Examiner* — Kim Huynh
*Assistant Examiner* — Vincent Chang
(74) *Attorney, Agent, or Firm* — Altis Law Group, Inc.

(57) ABSTRACT

A method for adjusting central processing unit (CPU) frequency according to the CPU utilization rate in a computer, the method includes the following steps. A Basic Input Output System (BIOS) is booted by turning on the computer. A performance monitor in the CPU is started by the BIOS. A timer is turned on by the BIOS. The system management interrupt program is read by the timer during a time period. A number of clock signals and time values is recorded by the performance monitor in two adjacent time periods. The CPU utilization rate is determined by the performance monitor according to number of clock signals, the time values, and a CPU clock speed. A CPU frequency is adjusted by the BIOS according to the CPU utilization rate. The computer's operation system (OS) is booted by the BIOS.

9 Claims, 2 Drawing Sheets

METHOD AND SYSTEM FOR ADJUSTING CPU FREQUENCY

BACKGROUND

1. Technical Field

The disclosure generally relates to frequency adjusting method and system, and especially to a method and system for adjusting a central processing unit (CPU) frequency to save power.

2. Description of Related Art

With the rapid development of personal computers, development of high performance components for computers have brought about a corresponding increase in power use. A CPU has a crucial effect on the stability of the computer. A power supply system is specially designed for providing power to the CPU. In many power supply systems, the CPU is controlled by the computer operation system (OS). The OS works out the CPU utilization rate to control the CPU frequency. However, when the CPU works under a low frequency, the Basic Input Output System (BIOS) cannot work out the CPU utilization rate to control the CPU frequency, which leads to a waste of power.

Therefore there is a need for improvement in the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
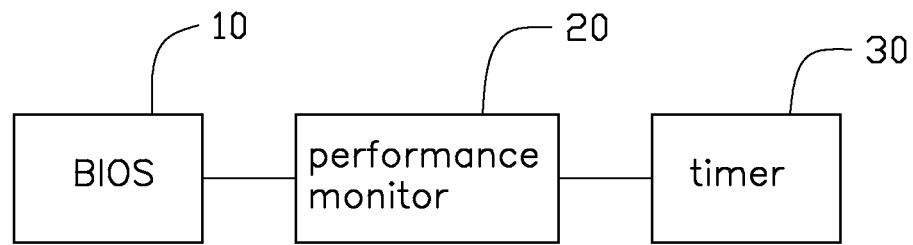
FIG. 1 is a block diagram of an embodiment of a system for adjusting a CPU frequency.

Referring to FIG. 1, an embodiment of a system for adjusting a CPU (not shown) frequency according to the CPU utilization rate in a computer includes a BIOS 10, a performance monitor 20 and a timer 30. The performance monitor 20 is located in the CPU. The timer 30 stores a system management interrupt program and the timer 30 reads the system management interrupt program during a time period. The performance monitor 20 records a number of clock signals and time values while the timer 30 reads the system management interrupt program in two adjacent time periods. The performance monitor 20 works out the CPU utilization rate according to the number of clock signals, the time values, and the CPU clock speed. The BIOS 10 adjusts the CPU frequency according to the CPU utilization rate.

Figure 2:
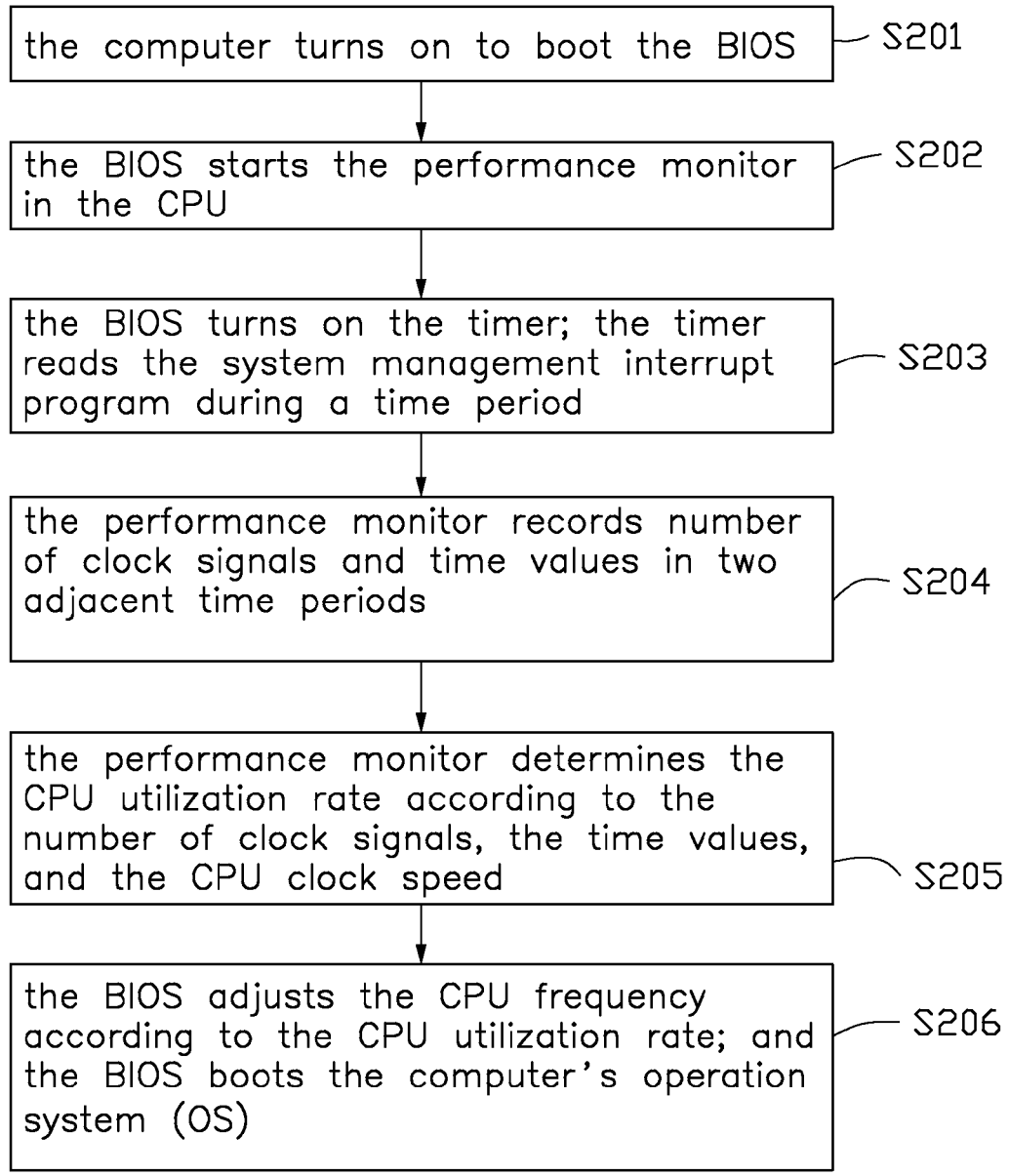
FIG. 2 is a flow chart of an embodiment of a method for adjusting a CPU frequency.

FIG. 2 is a flow chart illustrating a method for adjusting CPU frequency. Depending on the embodiment, certain steps described below may be removed, while others may be added, and the sequence of the steps may be altered. In one embodiment, the method for adjusting a CPU frequency utilizing the above-described system includes the following steps:

S201: the computer turns on to boot the BIOS 10;

S202: the BIOS 10 starts the performance monitor 20 in the CPU;

S203: the BIOS 10 turns on the timer 30; the timer 30 reads the system management interrupt program during a time period;

S204: the performance monitor 20 records number of clock signals and time values in two adjacent time periods;

S205: the performance monitor 20 determines the CPU utilization rate according to the number of clock signals, the time values, and the CPU clock speed;

S206: the BIOS 10 adjusts the CPU frequency according to the CPU utilization rate; and the BIOS 10 boots the computer's operation system (OS).

The CPU utilization rate can be calculated according to:

$$\frac{C2 - C1}{(T2 - T1) \times f}$$

Wherein, C1 and C2 are number of clocked signals while the timer 30 reads the system management interrupt program in the two adjacent time periods. T1 and T2 are time values while the timer 30 reads the system management interrupt program in the two adjacent time periods. f is the CPU clock speed. A differential value of the time values T1 and T2 multiplied by the CPU clock speed f is a total number of clock signals in one clock cycle the timer 30 reads the system management interrupt program. And a differential value of the number of clock signals C1 and C2 divided by the total number of clock signals is the CPU utilization rate.

It is to be understood, however, that even though numerous characteristics and advantages of the embodiments have been set forth in the foregoing description, together with details of the structure and function of the embodiments, the disclosure is illustrative only, and changes may be made in detail, especially in matters of shape, size, and arrangement of parts within the principles of the invention to the full extent indicated by the broad general meaning of the terms in which the appended claims are expressed. It is also to be understood that the above description and the claims drawn to a method may include some indication in reference to certain steps. However, the indication used is only to be viewed for identification purposes and not as a suggestion as to an order for the steps.

What is claimed is:

1. A method for adjusting central processing unit (CPU) frequency according to a CPU utilization rate in a computer, the method comprises the following steps:

turning on the computer to boot a Basic Input Output System (BIOS);

starting a performance monitor in the CPU by the BIOS;

turning on a timer by the BIOS;

reading a system management interrupt program during a time period by the timer;

recording a number of clock signals and time values by the performance monitor in two adjacent time periods;

determining the CPU utilization rate by the performance monitor according to the number of clock signals, the time values, and a CPU clock speed; wherein the CPU utilization rate is calculated according to:

$$\frac{C2 - C1}{(T2 - T1) \times f};$$

wherein C1 and C2 are number of clocked signals in the two adjacent time periods; T1 and T2 are the time values in the two adjacent time periods; and f is the CPU clock speed;

adjusting a CPU frequency by the BIOS according to the CPU utilization rate; and booting the computer's operation system (OS) by the BIOS.

2. The method of claim 1, wherein a differential value of the time values T1 and T2 multiplied by the CPU clock speed f is a total number of clock signals in one clock cycle the timer reads the system management interrupt program.

3. The method of claim 2, wherein the differential value of the number of clock signals C1 and C2 divided by the total number of clock signals is the CPU utilization rate.

4. A system for adjusting a CPU frequency according to a CPU utilization rate in a computer comprising:

a timer configured to store a system management interrupt program and read the system management interrupt program during a time period;

a performance monitor configured to record a number of clock signals and time values in two adjacent time periods, and determine the CPU utilization rate according to the number of clock signals, the time values, and a CPU clock speed; wherein the CPU utilization rate is calculated according to:

$$\frac{C2 - C1}{(T2 - T1) \times f};$$

wherein C1 and C2 are number of clocked signals in the two adjacent time periods; T1 and T2 are the time values in the two adjacent time periods; and f is the CPU clock speed; and a BIOS configured to adjust the CPU frequency according to the CPU utilization rate.

5. The system of claim 4, wherein a differential value of the time values T1 and T2 multiplied by the CPU clock speed f is a total number of clock signals in one clock cycle the timer reads the system management interrupt program.

6. The system of claim 5, wherein the differential value of the number of clock signals C1 and C2 divided by the total number of clock signals is the CPU utilization rate.

7. A method for adjusting central processing unit (CPU) frequency according to a CPU utilization rate in a computer, the method comprises the following steps:

turning on the computer to boot a Basic Input Output System (BIOS);

providing a timer for storing a system management interrupt program and reading the system management interrupt program during a time period;

providing a performance monitor in the CPU for recording a number of clock signals and time values in two adjacent time periods, and determining the CPU utilization rate according to the number of clock signals, the time values, and a CPU clock speed; wherein the CPU utilization rate is calculated according to:

$$\frac{C2 - C1}{(T2 - T1) \times f};$$

wherein C1 and C2 are number of clocked signals in the two adjacent time periods; T1 and T2 are the time values in the two adjacent time periods; and f is the CPU clock speed; and adjusting a CPU frequency by the BIOS according to the CPU utilization rate; booting the computer's operation system (OS) by the BIOS.

8. The method of claim 7, wherein a differential value of the time values T1 and T2 multiplied by the CPU clock speed f is a total number of clock signals in one clock cycle the timer reads the system management interrupt program.

9. The method of claim 8, wherein the differential value of the number of clock signals C1 and C2 divided by the total number of clock signals is the CPU utilization rate.

\* \* \* \* \*